United States Patent [19]

Olsen et al.

[11] Patent Number: 5,494,648
[45] Date of Patent: Feb. 27, 1996

[54] PROCESS FOR REMOVING THORIUM AND RECOVERING VANADIUM FROM TITANIUM CHLORINATOR WASTE

[75] Inventors: Richard S. Olsen, Albany; John T. Banks, Corvallis, both of Oreg.

[73] Assignee: The United States of America as represented by the Secretary of the Interior, Washington, D.C.

[21] Appl. No.: 188,863

[22] Filed: Jan. 31, 1994

[51] Int. Cl.$^6$ .......................... C22B 60/02; C22B 34/22
[52] U.S. Cl. .................. 423/17; 423/20; 423/65; 423/68
[58] Field of Search .................. 423/11, 17, 20, 423/65, 82, 83, 84, 85, 140, 68, 252

[56] References Cited

U.S. PATENT DOCUMENTS

| | | | |
|---|---|---|---|
| 3,016,286 | 1/1962 | Masukawa et al. | 423/147 |
| 3,975,495 | 8/1976 | Bowerman | 423/55 |
| 4,446,116 | 5/1984 | Krismer et al. | 423/63 |
| 4,451,438 | 5/1984 | Floeter et al. | 423/20 |
| 5,049,363 | 9/1991 | Feuling | 423/21.1 |
| 5,181,956 | 1/1993 | Chao | 75/743 |
| 5,271,910 | 12/1993 | van der Meer et al. | 423/55 |

*Primary Examiner*—Ngoclan Mai
*Attorney, Agent, or Firm*—E. Philip Koltos

[57] ABSTRACT

A process for removal of thorium from titanium chlorinator waste comprising: (a) leaching an anhydrous titanium chlorinator waste in water or dilute hydrochloric acid solution and filtering to separate insoluble minerals and coke fractions from soluble metal chlorides; (b) beneficiating the insoluble fractions from step (a) on shaking tables to recover recyclable or otherwise useful $TiO_2$ minerals and coke; and (c) treating filtrate from step (a) with reagents to precipitate and remove thorium by filtration along with acid metals of Ti, Zr, Nb, and Ta by the addition of the filtrate (a), a base and a precipitant to a boiling slurry of reaction products (d); treating filtrate from step (c) with reagents to precipitate and recover an iron vanadate product by the addition of the filtrate (c), a base and an oxidizing agent to a boiling slurry of reaction products; and (e) treating filtrate from step (d) to remove any remaining cations except Na by addition of $Na_2CO_3$ and boiling.

9 Claims, 1 Drawing Sheet

5,494,648

PROCESS FOR REMOVING THORIUM AND RECOVERING VANADIUM FROM TITANIUM CHLORINATOR WASTE

BACKGROUND OF THE INVENTION

1. Field of the Invention

The present invention relates generally to a process for extracting thorium from titanium chlorinator waste. More particularly, the invention pertains to a process for removing thorium from titanium chlorinator waste by leaching the anhydrous waste in water or dilute hydrochloric acid solution and filtering to separate insoluble minerals and coke from soluble metal chlorides. Thereafter, the insoluble minerals are beneficiated on shaking tables to recover recyclable or otherwise useful $TiO_2$ mineral concentrate and coke tailings, and the filtrate of soluble metal chlorides is treated with reagents to precipitate and remove thorium by filtration along with acid metals of Ti, Zr, Nb, and Ta by the addition of the filtrate, a base such as NaOH, $NH_4OH$ and $Na_2CO_3$ and a precipitant such as $Na_4P_2O_7$ to a boiling slurry of the reaction products.

DESCRIPTION OF THE PRIOR ART

Vanadium is a metal which has been used primarily as an alloying element for steels and irons; however, a large or principal source of vanadium is present as a by-product from titanium chlorinator waste.

For example, it is known that most titanium dioxide pigments and all titanium metals are produced from a titanium tetrachloride intermediate. This intermediate is made by reacting titanium minerals such as rutile, beach ilmenite, upgraded beach ilmenites and certain titaniferous slags in a fluidized bed chlorinator. However, conditions in the fluidized bed reactor are so severe that all minerals that enter (with the exception of silica) are chlorinated to their respective chlorides. These chlorides leave the fluidized bed reactor along with the product titanium tetrachloride and finely divided mineral and coke dusts. Condensation and separation produces the titanium tetrachloride product and a waste product containing unreacted titanium minerals, silica, and coke dusts and the chlorides of various other metals.

Amongst these various other metals are valuable metals such as vanadium and potentially hazardous metals such as chromium and radioactive thorium.

European Patent Application No. 90200761.6 disclose slurrying titanium chlorinator waste in HCl solution; filtering the slurry; and precipitating all of the metals into one waste product; however, it does not provide for the removal of radioactive thorium or the recovery of vanadium.

Nevertheless, although thorium finds use in industrial applications, it is a liability because of its low level of long term radioactivity. Moreover, waste products containing thorium must be kept at levels of less than 500 ppm thorium in order to escape environmental regulation.

Therefore, there is a need extant in industry to keep waste products containing thorium at levels less than 500 ppm thorium, by devising a process such that high levels of thorium could be used and the wastes therefrom could still meet the less than 500 ppm requirements.

There is a further need in industry that, upon removal of the thorium, other valued metals such as vanadium could be recovered.

SUMMARY OF THE INVENTION

Accordingly, one object of the present invention is to provide a process for removing radioactive thorium as a useful or easily disposable concentrate in a manner such that useful by-products such as vanadium can be recovered and any other residues will therefore be free of harmful levels of radioactivity.

A yet further object of the invention is to provide a process for removal of thorium whereby ores and concentrates containing more thorium can be used as chlorinator feed, in a manner such that the process is simple and not disruptive of the operations of the parent titanium plant.

In achieving the foregoing and other objects in accordance with the process of the present invention, as embodied and broadly described herein, titanium chlorinator waste is separated into useful by-products and concentrated wastes by: (1) leaching anhydrous chlorinator waste in water or dilute hydrochloric acid and filtering to provide an insoluble fraction and a filtrate containing metal chlorides; (2) beneficiating the insoluble fraction from the leaching step to make a titanium mineral concentrate and a coke tailing; (3) precipitating and recovering by filtration a thorium containing product from the filtrate of the leaching of step (1); (4) precipitating and recovering by filtration a vanadium product from the filtrate of step (3); and (5) precipitating remaining metals, which are primarily Fe, Al, and Cr to make a waste more reduced in quantity and toxicity than if the entire chlorinator waste stream were neutralized and precipitated as is normally the practice in titanium chlorination plants.

DETAILED DESCRIPTION OF THE INVENTION

Figure 1:
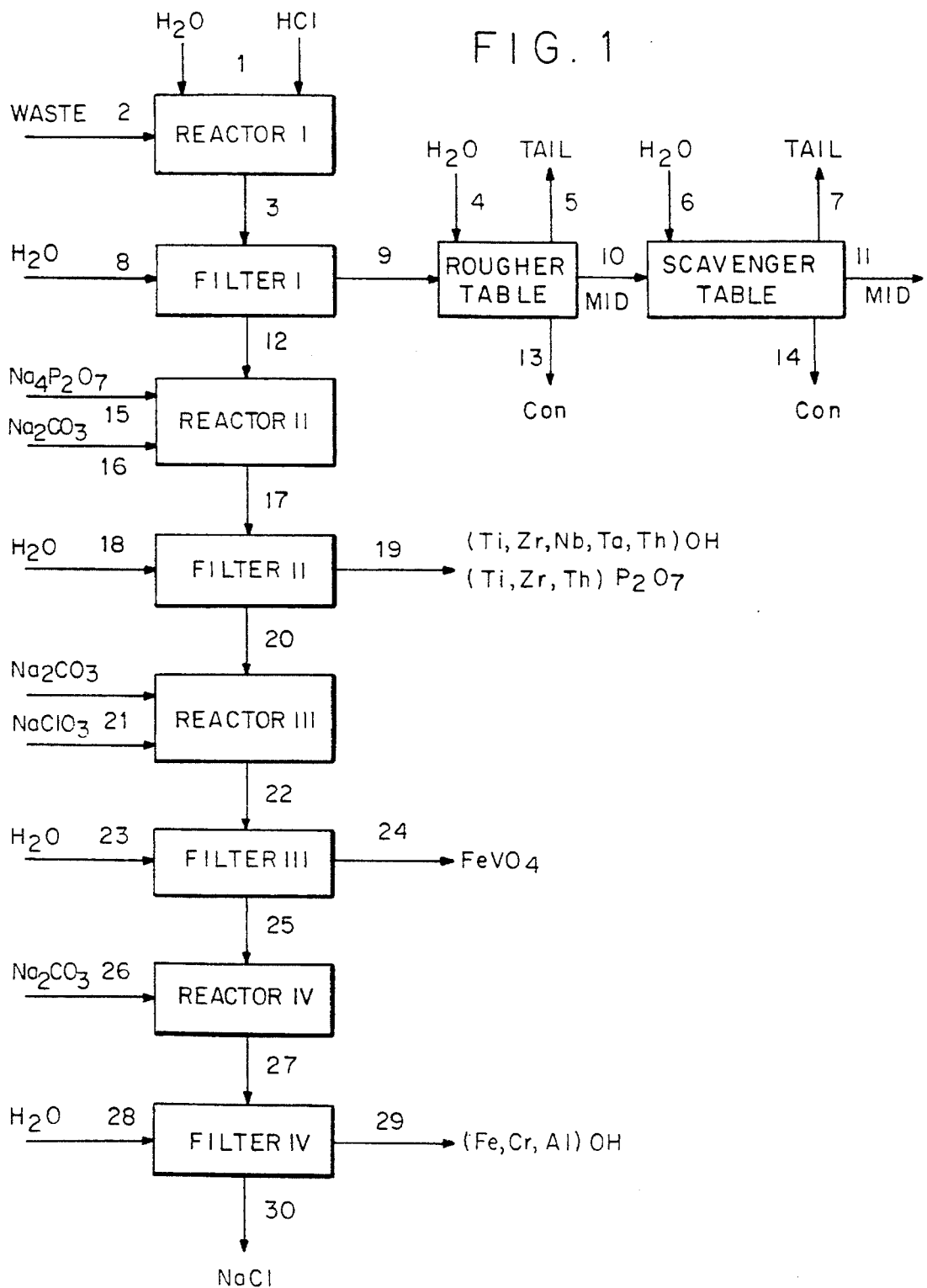
FIG. 1 is a flow diagram depicting in numerical sequence the stepwise process of the invention for removing thorium and recovering vanadium from titanium chlorinator waste through a series of reactors and filters.

As shown in the flowsheet in FIG. 1, a dry titanium chlorinator waste 2 containing insoluble minerals and coke along with anhydrous metal chlorides is leached in water or dilute acid in reactor I (Titanium chlorinator wastes from some sources are easily soluble in water alone while others require dilute hydrochloric acid to obtain adequate solubility of the chlorides of Ti, Zr, Nb, Ta, Th and V). The leached slurry is filtered on filter I to separate insoluble minerals and coke from the liquor containing the soluble metal chlorides.

The solids from filter I are beneficiated on shaking tables equipped with slime decks to make concentrates of $TiO_2$ ore, coke tailings, and a scavenger middling containing primarily silica sand. The $TiO_2$ concentrates and coke are recyclable to the chlorination unit or may serve other useful purposes such as a welding rod coating or a boiler fuel, respectively.

The underflow solution from filter I is fed separately and simultaneously with solutions of sodium carbonate and sodium pyrophosphate to a boiling slurry of reaction products in reactor II. At an acidity around pH 0.6, Ti, Zr, Nb, Ta, and Th hydrolyze to form insoluble hydrolysis products (With acidity adjustment alone, this reaction is not complete for Th even when the pH is raised well above 2.5 and some thorium remains to contaminate the filtrate). Additions of sodium pyrophosphate are made to cause Th and Zr to coprecipitate as pyrophosphates, whereupon satisfactory removal of Th is achieved. The relatively large amount of Zr in the solution then causes almost complete precipitation and removal of the remaining phosphorous so that it does not interfere with later process steps.

Early efforts to precipitate a Th containing product resulted in a gelatinous unfilterable product, but simultaneous feeding of the process and reagent solutions to a reactor containing boiling reaction products and short holding times in reactor II produced flocky, fast filtering precipitates for separation on filter II. Analyses of the filtrates and ignited filter cakes are shown in Tables 1 and 2 as "Hydrolysis-1, Liquor and Cake" respectively.

The solid product from filter II contains essentially all of the Th and could be disposed of in a nuclear waste facility. The Th product can also find a profitable use as fuel for fast breeder reactors, or the entire Zr-Ti-Nb-Th by-product may be useful as a melt conditioner for the vitrification (melting to a glassy product) of low-level nuclear wastes.

The underflow solution from filter II is fed separately but simultaneously with sodium carbonate and sodium chlorate solutions to reactor III containing a boiling slurry of reaction products. At an acidity of about pH 1.0 an iron vanadate forms. This product is primarily $FeVO_4$ and around 2.5% chromium and is directly useful as charge material to a furnace for making metallic ferrovanadium. As is in the case of the first filtration, fast filtering slurries are produced.

The flow diagram of FIG. 1 shows the underflow solution from filter III being further neutralized in reactor IV to precipitate the remaining Fe, Cr and Al. This step is similar to those in reactors I and II and is easily accomplished. The resulting product is close to neutral and is easily disposable or useful as a source of Fe, if a way is found to negate the deleterious effects of residual chlorides in iron oxide by-products. The remaining NaCl solution is easily disposable.

The following examples will serve to more fully illustrate the process for removing thorium and recovering vanadium from titanium chlorinator waste of the invention, and the examples are given by way of illustration only and not by way of limitation.

Example 1

Operating conditions and results for a titanium chlorinator waste processed according to the procedures described above are shown in Table 1. Analyses of the products of the leaching step show that this waste contains a large amount of insoluble $TiO_2$ mineral concentrate and coke tailings. The filtrate is mostly iron chloride solution and contains 0.24 g/l Th.

Precipitation of the Th was accomplished by adding the filtrate from filter I separately, but simultaneously, with a solution containing sodium carbonate and sodium pyrophosphate to a reactor containing a slurry of boiling reaction products. This addition provided strong precipitation of Th and left only 0.009 g/l Th in the filtrate from filter II. Good removal of Th is also obtained in the analysis of the second hydrolysis solid product which contained 0.05% Th, and is equivalent to the limit of 500 ppm for naturally occurring radioactive materials (NORMs) in unregulated products. As such, it is freely useful as a source of V without concern for the radioactivity or nuclear contamination.

A second precipitate containing vanadium was made by adding the filtrate from step 1 separately and simultaneously with a solution of sodium carbonate to a reactor containing a boiling slurry of reaction products. The test was done before the improved process using an oxidizing agent was developed. As a consequence, the second product shows considerable coprecipitation of chromium at a pH of 2.6, where 64% of the vanadium in the original waste was recovered.

Both the first and second hydrolysis products made by the procedures in this example were curdy and therefore lent themselves to fast filtering. Separate, but simultaneous feeding of the process solution and reagent solutions to a reactor containing a boiling slurry of the reaction products caused the slurries to be fast filtering.

Example 2

Operating conditions and results for the treatment of a second titanium chlorinator waste are shown in Table 2. In this case, the ratio of soluble to insoluble material in the dry waste is about the same, but this waste contains more of the refractory metals Ti, Zr, Nb, Ta, V and Th and less Fe. The same process conditions were used as in Example 1, except that no acid was required to get satisfactory solubility of the metal chlorides in the leaching step. While no acid was used in the leaching step, a comparison of Tables 1 and 2 show that five times as much base was needed to do the first step partial neutralization in case 2. Table 2 shows that most of the Th reports to the first hydrolysis product leaving only 0.008 g/l in the filtrate from filter II. Good recovery of Th in the first hydrolysis product is confirmed by the small amount of Th (0.02%) found in the second hydrolysis product. This is well below the 500 ppm limit for naturally occurring radioactive material in unregulated products.

A vanadium containing product was precipitated from the filtrate from filter II by adding the filtrate and sufficient sodium carbonate to a boiling slurry of reaction products. Table 2 shows that this product contains roughly 1 part iron, 1 part chromium and 2 parts vanadium. As in the example of Table 1, this test was done prior to the use of oxidizing agents in the second precipitation, and a considerable amount of chromium was precipitated at pH 2.9.

Example 3

Operating conditions and results for an improved treatment of the same waste in Example 2 are shown in Table 3. In this case, sodium chlorate was used as an oxidizing agent in the second hydrolysis step. The first hydrolysis step was done in the same way as in the previous examples, and thorium was again satisfactorily precipitated and removed by simultaneous partial neutralization with sodium carbonate and precipitation with sodium pyrophosphate.

The second hydrolysis was done similar to that in Example 2, except that an oxidizing agent (sodium chlorate) was added to convert the vanadium to the pentavalent state. This caused a stronger precipitation of the vanadium in preference to chromium. As shown in Table 3, 56% of the vanadium in the original waste was precipitated in a product containing only 2.5% chromium. This product is high enough in vanadium and low enough in chromium to be used directly as a furnace feed for the production of metallic ferrovanadium.

As in the previous two examples, the use of simultaneous feeding of process solutions and reagents to a boiling slurry of products produced curdy, filterable precipitates in sharp contrast to earlier precipitation products that were gelatinous and very slow filtering.

TABLE 1

| | INPUTS | | | INPUTS | | | INPUTS |
|---|---|---|---|---|---|---|---|
| Test Number | F309 | | Ignited Hydro. Solids, FHN1-g | 2.717 | | Leach acidity | 0.7N HCl |
| Dry Waste, 400 g Initial | 100 | | Strip Liquor Sample, 1 | 0.025 | | Leach temperature | 40 C. |
| Pregnant Liquor, l | 0.263 | | Strip Liquor 2nd, l | 0.261 | | Leach time | 20 minutes |
| Pregnant liquor Sample, l | 0.00625 | | Strip Liquor Sample 2nd l | 0.025 | | Leach volume | 800 ml |
| Filter Cake, g | 67.325 | | Ignited Neut. Solids, FHN2-g | 1.302 | | pH Hydrolysis 1 | 0.71 |
| Strip Liquor, ml | 0.272 | | | | | pH Hydrolysis 2 | 2.63 |

| | LEACH | | | | CALC |
|---|---|---|---|---|---|
| | ANALYSES | | DISTRIBUTION | | HEAD |
| ELEMEN | LIQUOR g/l | CAKE wt % | SOLUBL wt % | INSOL wt % | SAMPLE wt % |
| Ti | 1.39 | 19.30 | 2.74 | 97.26 | 13.359 |
| Zr | 1.47 | 1.16 | 33.11 | 66.89 | 1.168 |
| Nb | 0.79 | 0.48 | 39.13 | 60.87 | 0.531 |
| Ta | 0.04 | 0.01 | 60.98 | 39.02 | 0.017 |
| V | 1.66 | 0.18 | 78.27 | 21.73 | 0.558 |
| Cr | 1.38 | 0.07 | 88.51 | 11.49 | 0.410 |
| Fe | 25.10 | 1.07 | 90.16 | 9.84 | 7.322 |
| Al | 4.99 | 0.2 | 90.69 | 9.31 | 1.447 |
| Th | 0.24 | 0.01 | 90.36 | 9.64 | 0.070 |
| U | 0.001 | 0.01 | 3.76 | 96.24 | 0.007 |
| P | | | | | |
| C | | 44.6 | 0.00 | 100.00 | 46.126 |
| Si | | 4.34 | 0.00 | 100.00 | 4.489 |
| S | | 1.82 | 0.00 | 100.00 | 1.882 |

| | HYDROLYSIS - 1 | | | | HYDROLYSIS - 2 | | | |
|---|---|---|---|---|---|---|---|---|
| | ANALYSES | | DISTRIBUTION | | ANALYSES | | DISTRIBUTION | |
| ELEMEN | LIQUOR g/l | CAKE wt % | SOLUBL wt % | INSOL wt % | LIQUOR g/l | CAKE wt % | SOLUBL wt % | INSOL wt % |
| Ti | 0.010 | 13.50 | 0.02 | 2.81 | 0.001 | 0.28 | 0.002 | 0.031 |
| Zr | 0.003 | 13.40 | 0.07 | 31.94 | 0.001 | 0.10 | 0.025 | 0.126 |
| Nb | 0.002 | 6.67 | 0.10 | 34.96 | 0.001 | 0.01 | 0.055 | 0.028 |
| Ta | 0.001 | 0.28 | 1.61 | 45.17 | 0.001 | 0.01 | 1.706 | 0.851 |
| V | 1.370 | 1.81 | 68.44 | 9.03 | 0.140 | 24.50 | 7.390 | 64.512 |
| Cr | 1.210 | 0.97 | 82.21 | 6.58 | 0.730 | 9.39 | 52.411 | 33.631 |
| Fe | 22.600 | 12.7 | 86.00 | 4.83 | 18.800 | 32.10 | 75.597 | 6.439 |
| Al | 4.650 | 0.47 | 89.53 | 0.90 | 4.030 | 1.09 | 81.995 | 1.106 |
| Th | 0.009 | 2.18 | 3.59 | 86.86 | 0.006 | 0.05 | 2.529 | 1.051 |
| U | 0.001 | 0.01 | 3.98 | 3.98 | 0.001 | 0.01 | 4.209 | 2.099 |
| P | 0.0527 | 9.52 | 5.25 | 94.75 | 0.0261 | 0.49 | 2.748 | 2.574 |
| C | | | 0.00 | 0.00 | | | 0.000 | 0.000 |
| Si | | | 0.00 | 0.00 | | | 0.000 | 0.000 |
| S | | | 0.00 | 0.00 | | | 0.000 | 0.000 |
| | 16.7 ml, 120 g/l Na4P2O7*10H2O | | | | 20 ml 4N Na$_2$CO$_3$ | | | |
| | 0.278 g P/100 g waste | | | | | | | |
| | 5 ml 4N Na$_2$CO$_3$ | | | | | | | |

TABLE 2

| | INPUTS | | | INPUTS | | | INPUTS |
|---|---|---|---|---|---|---|---|
| Test Number | F325 | | Ignited Hydro. Solids, FHN1-g | 8.299 | | Leach acidity | H2O |
| Dry Waste, 400 g Initial | 100 | | Strip Liquor Sample, 1 | 0.025 | | Leach temperature | 40 C. |
| Pregnant Liquor, l | 0.246 | | Strip Liquor 2nd, l | 0.243 | | Leach time | 20 minutes |
| Pregnant liquor Sample, l | 0.00625 | | Strip Liquor Sample 2nd l | 0.025 | | Leach volume | 800 ml |
| Filter Cake, g | 66.200 | | Ignited Neut. Solids, FHN2-g | 1.662 | | pH Hydrolysis 1 | 0.53 |
| Strip Liquor, ml | 0.244 | | | | | pH Hydrolysis 2 | 2.88 |

| | LEACH | | | | CALC |
|---|---|---|---|---|---|
| | ANALYSES | | DISTRIBUTION | | HEAD |
| ELEMEN | LIQUOR g/l | CAKE wt % | SOLUBL wt % | INSOL wt % | SAMPLE wt % |
| Ti | 2.25 | 8.21 | 9.23 | 90.77 | 5.987 |
| Zr | 11.70 | 1.40 | 75.61 | 24.39 | 3.799 |
| Nb | 4.36 | 0.74 | 68.60 | 31.40 | 1.560 |

TABLE 2-continued

| | | | | | |
|---|---|---|---|---|---|
| Ta | 0.33 | 0.01 | 92.45 | 7.55 | 0.088 |
| V | 6.17 | 0.11 | 95.41 | 4.59 | 1.588 |
| Cr | 2.72 | 0.16 | 86.31 | 13.69 | 0.774 |
| Fe | 15.80 | 1.47 | 79.94 | 20.06 | 4.852 |
| Al | 5.87 | 0.66 | 76.73 | 23.27 | 1.878 |
| Th | 0.086 | 0.01 | 76.13 | 23.87 | 0.028 |
| U | 0.039 | 0.01 | 59.12 | 40.88 | 0.016 |
| P | | | | | |
| C | | 65.0 | 0.00 | 100.00 | 64.603 |
| Si | | 2.54 | 0.00 | 100.00 | 2.524 |
| S | | 1.26 | 0.00 | 100.00 | 1.252 |

| | HYDROLYSIS - 1 | | | | HYDROLYSIS - 2 | | | |
|---|---|---|---|---|---|---|---|---|
| | ANALYSES | | DISTRIBUTION | | ANALYSES | | DISTRIBUTION | |
| ELEMEN | LIQUOR g/l | CAKE wt % | SOLUBL wt % | INSOL wt % | LIQUOR g/l | CAKE wt % | SOLUBL wt % | INSOL wt % |
| Ti | 0.006 | 6.21 | 0.03 | 8.83 | 0.001 | 0.11 | 0.005 | 0.035 |
| Zr | 0.003 | 28.90 | 0.02 | 64.78 | 0.001 | 0.11 | 0.007 | 0.055 |
| Nb | 0.001 | 11.20 | 0.02 | 61.13 | 0.001 | 0.01 | 0.018 | 0.012 |
| Ta | 0.001 | 0.80 | 0.29 | 77.74 | 0.001 | 0.02 | 0.317 | 0.434 |
| V | 3.650 | 6.09 | 57.56 | 32.67 | 1.230 | 23.60 | 21.524 | 28.246 |
| Cr | 2.110 | 1.29 | 68.28 | 14.20 | 0.830 | 13.50 | 29.804 | 33.155 |
| Fe | 13.600 | 6.65 | 70.18 | 11.67 | 11.900 | 9.41 | 68.136 | 3.685 |
| Al | 5.270 | 0.82 | 70.26 | 3.72 | 4.340 | 4.67 | 64.201 | 4.725 |
| Th | 0.006 | 0.18 | 5.42 | 55.27 | 0.003 | 0.02 | 3.005 | 1.370 |
| U | 0.032 | 0.01 | 49.47 | 5.26 | 0.023 | 0.01 | 39.456 | 1.173 |
| P | 0.002 | 2.48 | 0.24 | 99.76 | 0.0012 | 0.026 | 0.157 | 0.233 |
| C | | | 0.00 | 0.00 | | | 0.000 | 0.000 |
| Si | | | 0.00 | 0.00 | | | 0.000 | 0.000 |
| S | | | 0.00 | 0.00 | | | 0.000 | 0.000 |
| | 12.5 ml, 120 g/l Na4P2O7*10H2O | | | | 30 ml 4N NaOH | | | |
| | 0.208 g P/100 g waste | | | | | | | |
| | 25 ml 4N NaOH | | | | | | | |

TABLE 3

| | INPUTS | | INPUTS | | INPUTS |
|---|---|---|---|---|---|
| Test Number | F340 | Ignited Hydro. Solids, FHN1-g | 8.166 | Leach acidity | H2O |
| Dry Waste, 400 g Initial | 100 | Strip Liquor Sample, 1 | 0.025 | Leach temperature | 40 C. |
| Pregnant Liquor, 1 | 0.241 | Strip Liquor 2nd, 1 | 0.255 | Leach time | 20 minutes |
| Pregnant liquor Sample, 1 | 0.00625 | Strip Liquor Sample 2nd 1 | 0.025 | Leach volume | 800 ml |
| Filter Cake, g | 64.550 | Ignited Neut. Solids, FHN2-g | 3.782 | pH Hydrolysis 1 | 0.58 |
| Strip Liquor, ml | 0.258 | Leach liquor pH | 0.17 | pH Hydrolysis 2 | 0.99 |

| | LEACH | | | | CALC |
|---|---|---|---|---|---|
| | ANALYSES | | DISTRIBUTION | | HEAD |
| ELEMEN | LIQUOR g/l | CAKE wt % | SOLUBL wt % | INSOL wt % | SAMPLE wt % |
| Ti | 2.59 | 8.19 | 10.54 | 89.46 | 5.910 |
| Zr | 12.00 | 1.37 | 76.54 | 23.46 | 3.770 |
| Nb | 4.33 | 0.77 | 67.69 | 32.31 | 1.538 |
| Ta | 0.32 | 0.02 | 85.63 | 14.37 | 0.090 |
| V | 7.32 | 0.09 | 96.81 | 3.19 | 1.819 |
| Cr | 2.71 | 0.13 | 88.59 | 11.41 | 0.736 |
| Fe | 15.60 | 0.65 | 89.94 | 10.06 | 4.171 |
| Al | 5.98 | 0.65 | 77.42 | 22.58 | 1.858 |
| Th | 0.091 | 0.01 | 77.22 | 22.78 | 0.028 |
| U | 0.036 | 0.01 | 57.29 | 42.71 | 0.015 |
| P | | | | | |
| C | | 64.60 | 0.00 | 100.00 | 41.699 |
| Si | | 2.59 | 0.00 | 100.00 | 1.672 |
| S | | 1.32 | 0.00 | 100.00 | 0.852 |

TABLE 3-continued

| | HYDROLYSIS #1 | | | | HYDROLYSIS #2 | | | |
| | ANALYSES | | DISTRIBUTION | | ANALYSES | | DISTRIBUTION | |
| ELEMEN | LIQUOR g/l | CAKE wt % | SOLUBL wt % | INSOL wt % | LIQUOR g/l | CAKE wt % | SOLUBL wt % | INSOL wt % |
|---|---|---|---|---|---|---|---|---|
| Ti | 0.009 | 6.79 | 0.04 | 9.63 | 0.001 | 0.08 | 0.004 | 0.053 |
| Zr | 0.005 | 28.90 | 0.04 | 64.26 | 0.001 | 0.24 | 0.007 | 0.247 |
| Nb | 0.001 | 11.70 | 0.02 | 63.76 | 0.001 | 0.01 | 0.017 | 0.025 |
| Ta | 0.001 | 0.81 | 0.29 | 75.56 | 0.001 | 0.01 | 0.291 | 0.432 |
| V | 4.610 | 5.61 | 67.15 | 25.86 | 0.210 | 26.10 | 3.023 | 55.728 |
| Cr | 2.260 | 0.83 | 81.37 | 9.46 | 1.960 | 2.47 | 69.751 | 13.037 |
| Fe | 13.400 | 6.36 | 85.09 | 12.78 | 7.140 | 39.50 | 44.812 | 36.768 |
| Al | 5.090 | 0.44 | 72.57 | 1.99 | 4.550 | 0.24 | 64.120 | 0.502 |
| Th | 0.008 | 0.16 | 7.48 | 47.33 | 0.001 | 0.01 | 0.924 | 1.370 |
| U | 0.029 | 0.01 | 50.83 | 5.55 | 0.022 | 0.01 | 38.111 | 2.569 |
| P | 0.0005 | 2.24 | 0.07 | 99.93 | 0.0004 | 0.017 | 0.062 | 0.389 |
| C | | | | | | | | |
| Si | | | | | | | | |
| S | | | | | | | | |
| | 10 ml 120 g/l $Na_4P_2O_7 \cdot 10H_2O$ | | | | 20 ml 4N $NaCO_3$ | | | |
| | 0.166 g P/100 g waste | | | | 5 ml 5N $NaClO_3$ | | | |
| | 25 ml 4N $Na_2CO_3$ | | | | | | | |

While the foregoing description and illustrations of the present invention has been shown in detail with reference to preferred embodiments and modifications thereof, it is to be understood by those skilled in the art that the foregoing and other modifications are exemplary only, and that equivalent changes in composition and detail may be employed herein, without departing from the spirit and scope of the invention, which is defined by the appended claims.

We claim:

1. A process for removal of thorium from titanium chlorinator waste comprising:
    (a) leaching an anhydrous titanium chlorinator waste in water or dilute hydrochloric acid solution and filtering to separate insoluble minerals and coke fractions from soluble metal chlorides;
    (b) beneficiating the insoluble fractions from step (a) on shaking tables to recover recyclable or otherwise useful $TiO_2$ minerals and coke fractions;
    (c) treating filtrate from step (a) with reagents to precipitate thorium along with acid metals of Ti, Zr, Nb, and Ta by feeding separately and simultaneously with filtrate (a), a base and a precipitant into a reactor to obtain a boiling slurry of reaction products; and
    (d) filtering precipitates containing thorium.

2. A process for recovery of vanadium from titanium chlorinator waste comprising:
    (a) leaching anhydrous titanium chlorinator waste in water or dilute hydrochloric acid solution and filtering to separate insoluble minerals and coke fractions from soluble metal chlorides;
    (b) beneficiating the insoluble fractions from step (a) on shaking tables to recover recyclable or otherwise useful $TiO_2$ minerals and coke fractions;
    (c) treating filtrate from step (a) with reagents to precipitate thorium along with acid metals of Ti, Zr, Nb, and Ta by feeding separately and simultaneously with filtrate (a), a base and a precipitant into a reactor to obtain a boiling slurry of reaction products;
    (d) filtering precipitates containing thorium;
    (e) treating filtrate from step (d) with reagents to precipitate and recover an iron vanadate product by feeding separately and simultaneously with filtrate (d), a base and an oxidizing agent into a reactor to obtain a boiling slurry of reaction products;
    (f) filtering precipitates containing vanadium; and
    (g) treating filtrate from step (f) to remove any remaining cations except Na by addition of $Na_2CO_3$ and boiling.

3. The process of claims 1 or 2, wherein the base is selected from the group consisting of NaOH, $NH_4OH$ and $Na_2CO_3$.

4. The process of claims 1 or 2, wherein a base is added to step (c) so that the filtrate from step (a) displays an acidity of about pH 0.6.

5. The process of claims 1 or 2, wherein $Na_4P_2O_7$ is the precipitant and is added at a rate of about 0.2 grams/100 grams dry chlorinator waste to precipitation step (c).

6. The process of claim 2, wherein base is added in amounts to step (e) so that filtrate from step (d) displays an acidity of about pH 1.0.

7. The process of claim 2, wherein $NaClO_3$ is the oxidizing agent and is added to step (e) at a rate of about 2.5 grams/100 grams of dry chlorinator waste.

8. The process of claim 2, wherein base is added in step (g) so that the filtrate from step (f) displays an acidity of about pH 7.0.

9. The process of claims 1 or 2, wherein said feeding separately and simultaneously in steps (c) allow formation of a curdy, easily filterable thorium containing precipitate.

* * * * *